United States Patent
Roper et al.

(10) Patent No.: US 9,449,114 B2
(45) Date of Patent: Sep. 20, 2016

(54) REMOVING NON-SUBSTANTIVE CONTENT FROM A WEB PAGE BY REMOVING ITS TEXT-SPARSE NODES AND REMOVING HIGH-FREQUENCY SENTENCES OF ITS TEXT-DENSE NODES USING SENTENCE HASH VALUE FREQUENCY ACROSS A WEB PAGE COLLECTION

(75) Inventors: John Roper, Sammamish, WA (US); Dane Glasgow, Los Altos, CA (US)

(73) Assignee: PayPal, Inc., San Jose, CA (US)

(*) Notice: Subject to any disclaimer, the term of this patent is extended or adjusted under 35 U.S.C. 154(b) by 849 days.

(21) Appl. No.: 12/761,272

(22) Filed: Apr. 15, 2010

(65) Prior Publication Data
US 2011/0258528 A1    Oct. 20, 2011

(51) Int. Cl.
G06F 17/30    (2006.01)
G06F 17/21    (2006.01)
G06F 17/22    (2006.01)

(52) U.S. Cl.
CPC ....... *G06F 17/30905* (2013.01); *G06F 17/218* (2013.01); *G06F 17/2247* (2013.01)

(58) Field of Classification Search
CPC ........... G06F 17/30905; G06F 17/218; G06F 17/2247
USPC ...................................................... 715/254
See application file for complete search history.

(56) References Cited

U.S. PATENT DOCUMENTS

| | | | |
|---|---|---|---|
| 6,049,821 A * | 4/2000 | Theriault et al. | 709/203 |
| 7,089,490 B1 * | 8/2006 | Tan et al. | 715/234 |
| 7,328,405 B1 | 2/2008 | Hyatt et al. | |
| 7,519,621 B2 | 4/2009 | Harik | |
| 8,041,713 B2 * | 10/2011 | Lawrence | 707/726 |
| 8,538,989 B1 * | 9/2013 | Datar | G06F 17/30 707/780 |
| 2002/0129006 A1 | 9/2002 | Emmett et al. | |
| 2005/0055271 A1 | 3/2005 | Axe et al. | |
| 2005/0251536 A1 | 11/2005 | Harik | |
| 2008/0005094 A1 * | 1/2008 | Cunnane | G06F 17/2745 |
| 2008/0040316 A1 * | 2/2008 | Lawrence | 707/3 |
| 2010/0145952 A1 * | 6/2010 | Yoon et al. | 707/747 |
| 2011/0119571 A1 * | 5/2011 | Decker et al. | 715/205 |

OTHER PUBLICATIONS

Hwang, Yonghyun et al. "Structure-Aware Web Transcoding for Mobile Devices". Oct. 2003, IEEE.*
Prasad, Jyotika et al. "CoreEx: Content Extraction from Online News Articles". Oct. 30, 2008, ACM.*
Quasthoff, Uwe et al. "Corpus Portal for Search in Monolingual Corpora". May 28, 2006, 5th International Conference on Language Resources and Evaluation.*
Louvan, Samuel. "Extracting the Main Content from Web Documents", Aug. 2009 Eindhoven University of Technology.*

* cited by examiner

*Primary Examiner* — Cesar Paula
*Assistant Examiner* — Tyler J Schallhorn
(74) *Attorney, Agent, or Firm* — Schwegman Lundberg & Woessner, P.A.

(57) ABSTRACT

A method and system for removing chrome from a web page is provided. An example system includes a parsing module, a text density analyzer, a content node selector 206, and a text extractor. The parsing module may be configured to parse a web page into a tree structure. The text density analyzer may be configured to determine a text density score value for each node from the tree structure. The content node selector may be configured to identify one or more nodes from the tree structure as content nodes based on their respective text density score values. The text extractor may be configured to extract text from the content nodes only.

16 Claims, 6 Drawing Sheets

REMOVING NON-SUBSTANTIVE CONTENT FROM A WEB PAGE BY REMOVING ITS TEXT-SPARSE NODES AND REMOVING HIGH-FREQUENCY SENTENCES OF ITS TEXT-DENSE NODES USING SENTENCE HASH VALUE FREQUENCY ACROSS A WEB PAGE COLLECTION

TECHNICAL FIELD

This application relates to the technical fields of software and/or hardware technology and, in one example embodiment, to system and method for removing chrome from a web page

BACKGROUND

A document that can be provided on the World Wide Web and can be accessed through a web browser and displayed on a computer screen is usually referred to as a web page. A web page may be represented using a hierarchical markup language, such as, e.g., HyperText Markup Language (HTML) or eXtended HyperText Markup Language (XHTML). A web page may include substantive textual content (e.g., an article or a blog entry), and may also include navigation to other web pages via hypertext links, as well as advertisements. Information pertaining to layout, typographic and color-scheme information may be provided for a web page by Cascading Style Sheet (CSS) instructions that may be embedded in the associated HTML file. An HTML file associated with a web page may also include computer code (e.g., JavaScript® script or Java®) that may run on the client computer. Java and JavaScript are registered trademarks of Oracle, Inc. An HTML source for a page dedicated to a magazine article, for example, may include information that is not directly related to the article itself and thus is not considered to be substantive content. Any content that can be found in a file representing a web page that is not substantive content may be termed "chrome" or "web page chrome."

BRIEF DESCRIPTION OF DRAWINGS

Embodiments of the present invention are illustrated by way of example and not limitation in the figures of the accompanying drawings, in which like reference numbers indicate similar elements and in which.

DETAILED DESCRIPTION

In the following detailed description, numerous specific details are set forth to provide a thorough understanding of claimed subject matter. However, it will be understood by those skilled in the art that claimed subject matter may be practiced without these specific details. In other instances, methods, apparatuses or systems that would be known by one of ordinary skill have not been described in detail so as not to obscure claimed subject matter.

Some portions of the detailed description which follow are presented in terms of algorithms or symbolic representations of operations on binary digital signals stored within a memory of a specific apparatus or special purpose computing device or platform. In the context of this particular specification, the term specific apparatus or the like includes a general purpose computer once it is programmed to perform particular functions pursuant to instructions from program software. Algorithmic descriptions or symbolic representations are examples of techniques used by those of ordinary skill in the signal processing or related arts to convey the substance of their work to others skilled in the art. An algorithm is here, and generally, is considered to be a self-consistent sequence of operations or similar signal processing leading to a desired result. In this context, operations or processing involve physical manipulation of physical quantities. Typically, although not necessarily, such quantities may take the form of electrical or magnetic signals capable of being stored, transferred, combined, compared or otherwise manipulated. It has proven convenient at times, principally for reasons of common usage, to refer to such signals as bits, data, values, elements, symbols, characters, terms, numbers, numerals or the like. It should be understood, however, that all of these or similar terms are to be associated with appropriate physical quantities and are merely convenient labels. Unless specifically stated otherwise, as apparent from the following discussion, it is appreciated that throughout this specification discussions utilizing terms such as "processing," "computing," "calculating," "determining" or the like refer to actions or processes of a specific apparatus, such as a special purpose computer or a similar special purpose electronic computing device. In the context of this specification, therefore, a special purpose computer or a similar special purpose electronic computing device is capable of manipulating or transforming signals, typically represented as physical electronic or magnetic quantities within memories, registers, or other information storage devices, transmission devices, or display devices of the special purpose computer or similar special purpose electronic computing device.

Web pages related to a certain topic of interest may be collected and analyzed in order to derive a conclusion or a recommendation regarding the topic. The collected web pages may contain, in addition to text relevant to the topic, so-called chrome: a navigation panel (e.g., permitting a user to navigate to other web pages available within the web site), advertisement banners, and other objects that may not be relevant to the topic of interest. Also, the relevant text—a magazine article, for example—may conclude with a boilerplate sentence, such as a copyright notice, which would not contribute substantively in the process of deriving a recommendation based on the analysis of the text. Chrome removal method and system are described. The method and system may allow separating, automatically, relevant subject matter content of a web page (e.g., an HTML page) from items that also appear on the HTML page but may be considered less relevant to the subject matter, such as navigation, advertisements, and certain boilerplate information.

In one example embodiment, the process of chrome separation is performed in two stages. During the first stage, HTML hierarchy of each collected web page is examined to determine which nodes can be reasonably ignored as not likely to contain information relevant to the target subject matter. This determination is based on the premise that text-sparse nodes are less likely to include relevant information than nodes associated with higher text density. Nodes in the HTML hierarchy that have text density greater than a predetermined threshold value are identified as content nodes. After the content nodes are identified in a web page, a module in the chrome removal system extracts text from the content nodes. Text extracted from all collected web pages as a result of the first stage processing is then analyzed further. The further analysis may be viewed as the second stage of chrome separation.

During the second stage, the extracted text is analyzed in order to break it up into sentences, e.g., by determining punctuation marks, carriage returns, and other printable and non-printable characters that may be indicative of an end or a beginning of a sentence. Each sentence is then hashed. The chrome removal system may then parse the hashed sentences to detect any boilerplate language by identifying sentences that occur suspiciously frequently across all collected web pages. It will be noted that method and system for chrome removal may be utilized advantageously to remove chrome from web pages represented by HTML as well as other hierarchical mark-up languages.

Figure 1:
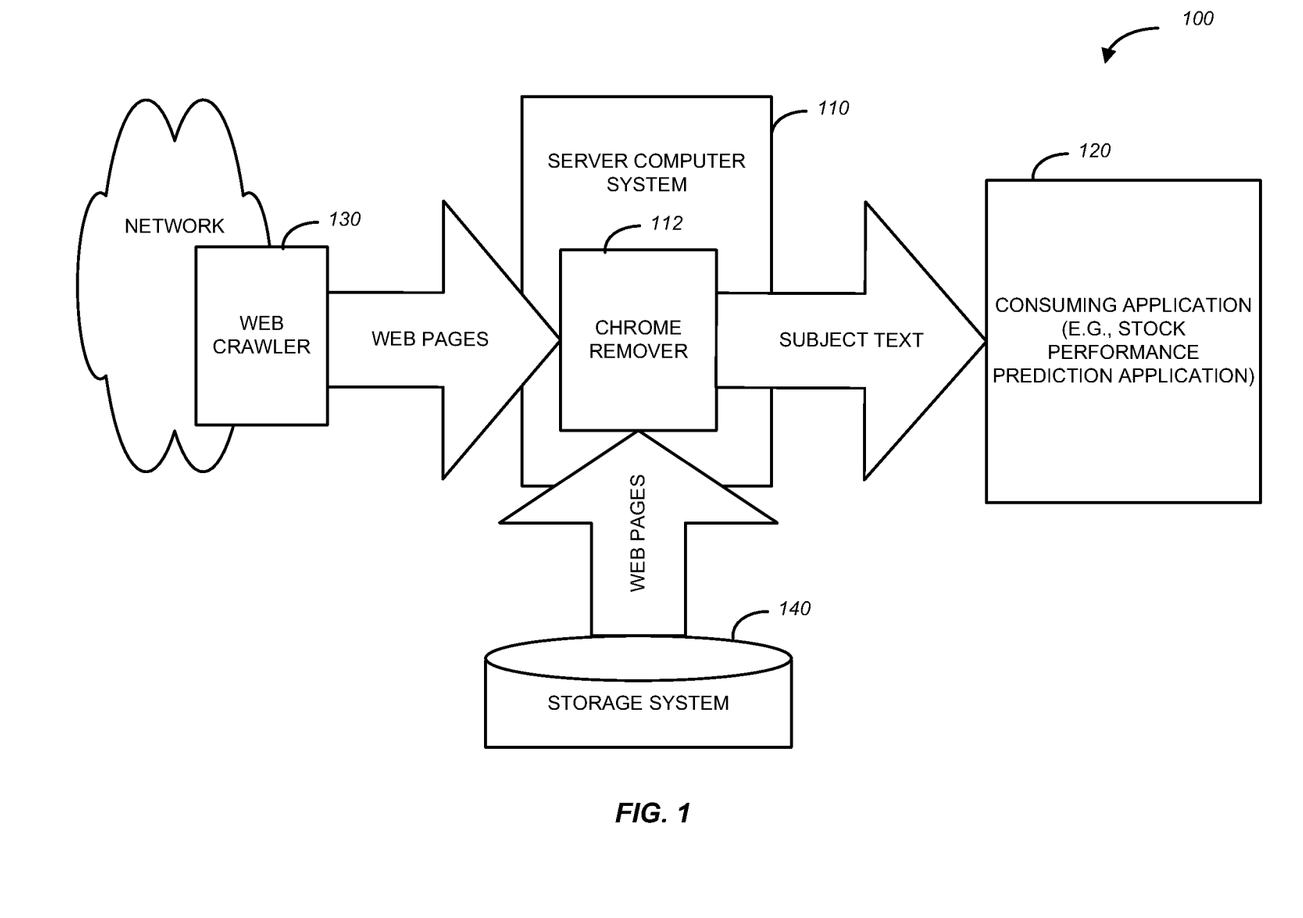
FIG. 1 is a diagrammatic representation of example architecture of method and system for removing chrome from a web page.

Example architecture 100 of method and system for removing chrome from a web page may be described with reference to FIG. 1. As shown in FIG. 1, a chrome remover system (also referred to as merely chrome remover) 112 may be provided at a server computer system 110. The chrome remover 112 may be configured to receive web pages represented in a hierarchical mark-up language (such as, e.g., HTML or XHTML), identify chrome and provide subject text (that has been substantially freed from chrome) to a consuming application 120. Web pages may be provided to the chrome remover, e.g., as a result of activities performed by a web crawler 130, or from a storage system 140. The chrome remover 112 may be implemented as a stand-alone computer application or it may be provided as a computer module within a larger computing program or computer system. An example chrome remover may be described with reference to in FIG. 2.

Figure 2:
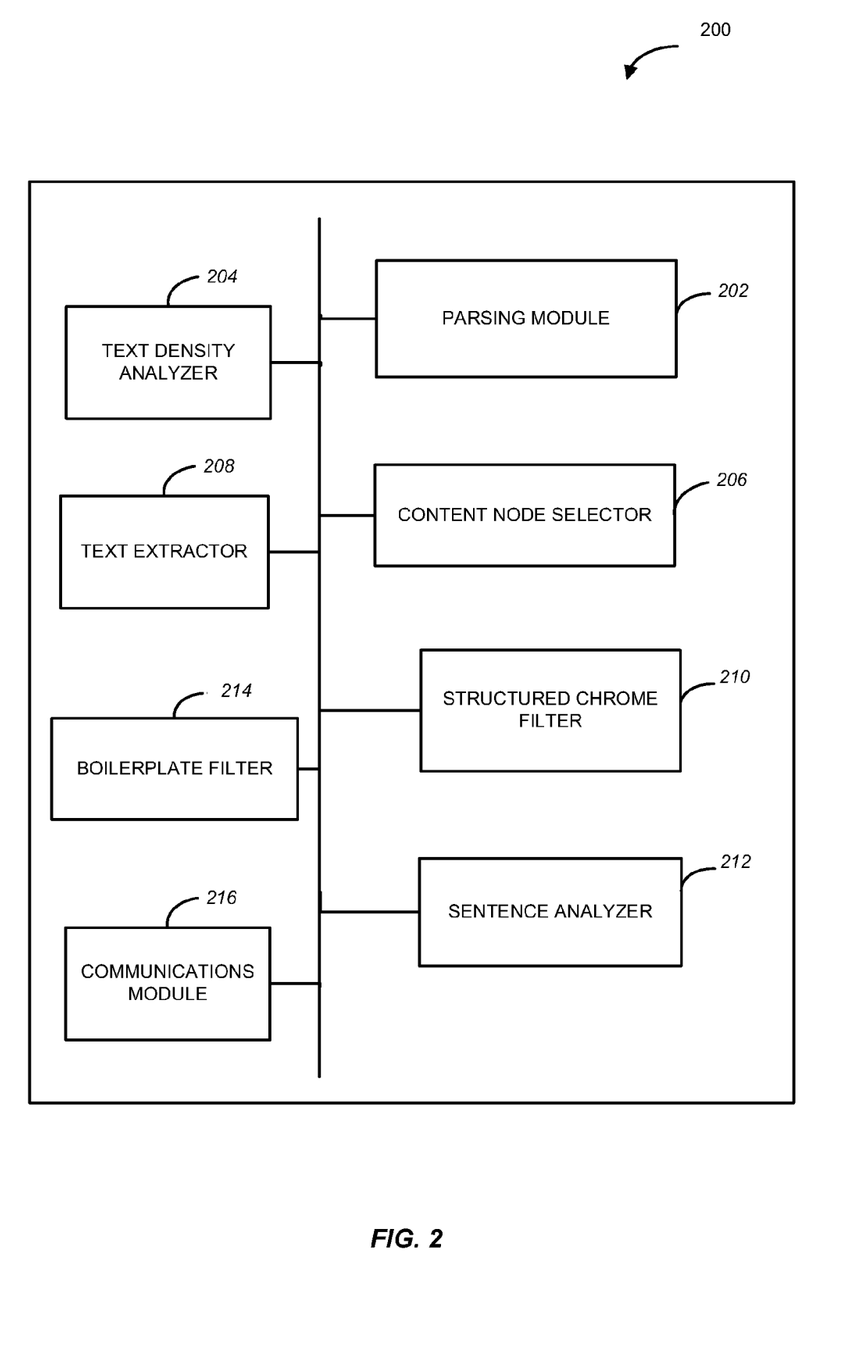
FIG. 2 is a block diagram of a system for removing chrome from a web page, in accordance with one example embodiment.

FIG. 2 is a block diagram of a system 200 configured to remove chrome from web pages, in accordance with one example embodiment. The system 200 may also be referred to as a chrome remover 200. Various modules shown in FIG. 2 may be implemented as software, hardware, or a combination thereof.

As shown in FIG. 2, a chrome remover 200 includes a parsing module 202, a text density analyzer 204, a content node selector 206, and a text extractor 208. The parsing module 202 is configured to parse a web page into a tree structure based on HTML hierarchy associated with the web page. The text density analyzer 204 is configured to determine a text density score value for each node from the tree structure. The content node selector 206 is configured to identify one or more nodes from the tree structure as content nodes based on their respective text density score values. The text extractor 208 is configured to extract text from the content nodes. While the text extractor 208 extracts text from the content nodes, any nodes that were not identified as content nodes are ignored.

As mentioned above, a web page may include CSS or JavaScript® instructions embedded in the associated HTML. These instructions, as well as HTML comments are easily identifiable as data that is not subject matter content. Embedded CSS or JavaScript® instructions, as well as HTML comments may be referred to as structured chrome. The chrome remover 200 may include a structured chrome filter 210 configured to remove structured chrome from web pages. The parsing module 202, the text density analyzer 204, the content node selector 206, the text extractor 208, and the structured chrome filter 210 may be utilized during the first stage of the chrome removal process that results in extracting text from those nodes in an HTML tree that have been identified as content nodes. It will be noted that while text is extracted from content nodes, HTML tags themselves are not extracted as the tags are not regarded as text that is relevant to the subject matter associated with the collected web pages.

The chrome remover 200 also includes modules that are utilized during the second stage of chrome removal. These modules are a sentence analyzer 212 and a boilerplate filter 214. The sentence analyzer 212 may be configured to analyze text extracted from content nodes of web pages related to certain subject matter and to identify one or more sentences indicative of boilerplate language (e.g., copyright notices). The boilerplate filter 214 may be configured to remove from the extracted text the one or more sentences indicative of boilerplate language to produce subject text.

Also shown in FIG. 2 is a communications module 216. The communications module 216 may be configured to receive or access web pages (e.g., web pages collected with the use of the web crawler 130 of FIG. 1 or from the storage system 140 of FIG. 1. The communications module 216 may also be used to provide the subject text to the consuming application 120 of FIG. 1.

Figure 3:
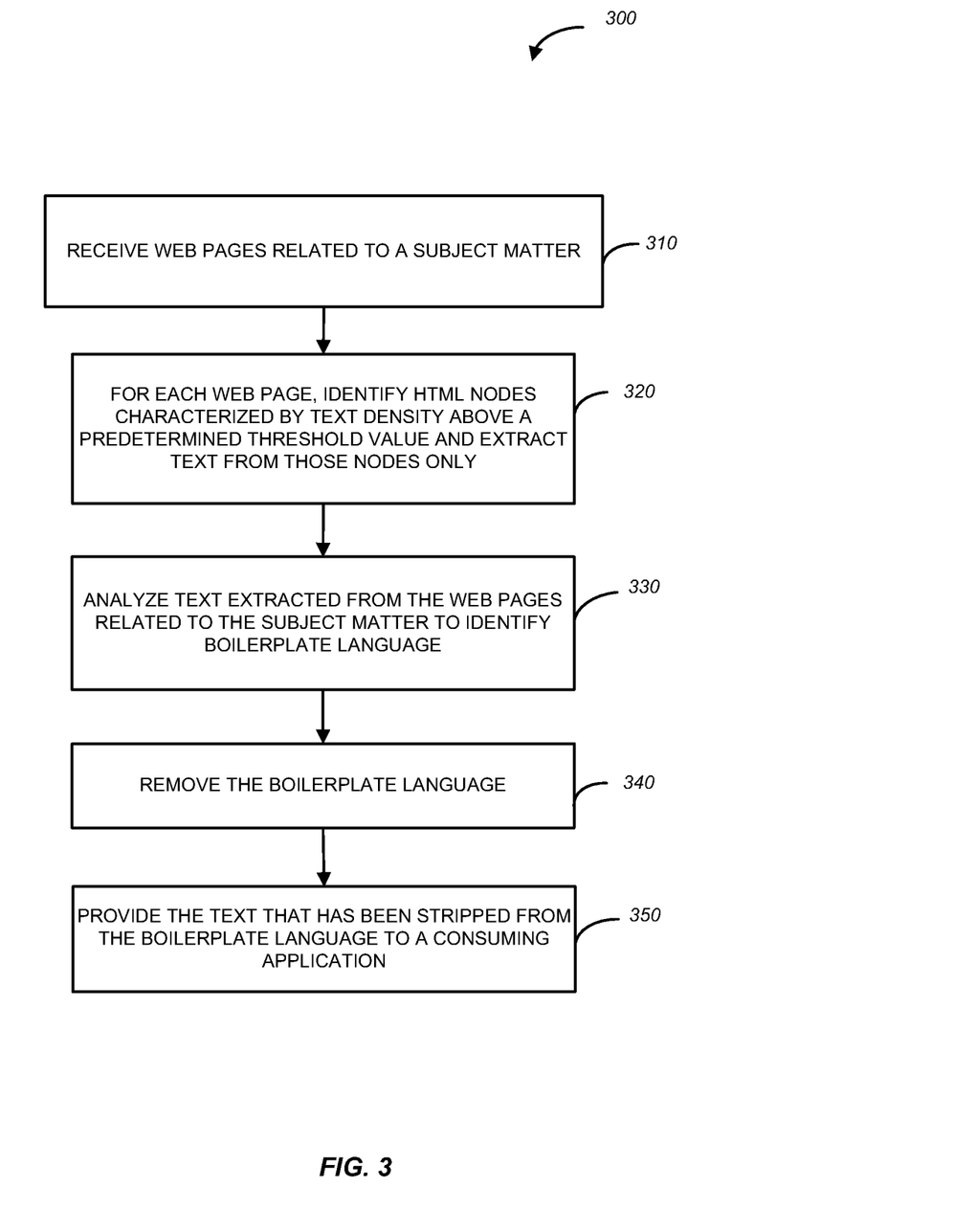
FIG. 3 is a flow chart of a method for removing chrome from a web page, in accordance with an example embodiment.

An example method utilizing a chrome remover may be described with reference to FIG. 3. FIG. 3 is a flow chart of a method 300 to remove chrome from web pages, according to one example embodiment. The method 300 may be performed by processing logic that may comprise hardware (e.g., dedicated logic, programmable logic, microcode, etc.), software (such as run on a general purpose computer system or a dedicated machine), or a combination of both. In one example embodiment, the processing logic resides at the server system 110 of FIG. 1 and, specifically, at the system 200 shown in FIG. 2.

As shown in FIG. 3, the method 300 commences at operation 310, when the chrome remover 112 of FIG. 2 receives web pages related to a specific topic or subject matter. For each web page, the chrome remover 112 identifies HTML nodes characterized by text density above a predetermined threshold value and extracts text from those nodes (operation 320). At operation 330, the extracted text is analyzed to determined whether it contains boilerplate language (e.g., copyright notices) so that such boilerplate text can be removed (operation 340) prior to providing the relevant content to a consuming application (operation 350).

Figure 4:
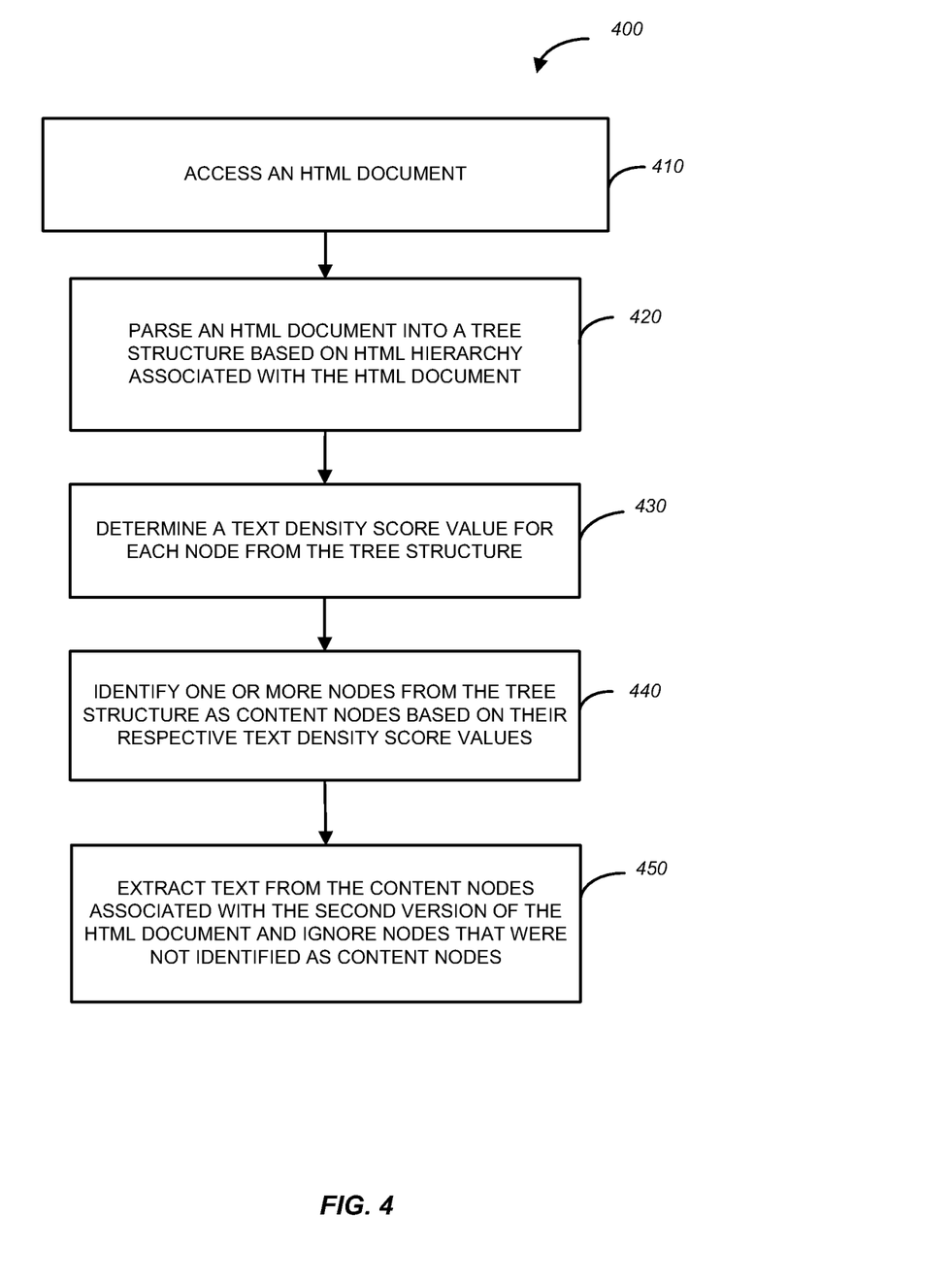
FIG. 4 is a flow chart of a method for determining content nodes, in accordance with an example embodiment.

Example operations that may be performed in order to determine which HTML nodes of a web page may be considered content nodes (the process referred to as stage one in the description above) may be described with reference to FIG. 4. FIG. 4 is a flow chart of a method 400 to remove chrome from web pages, according to one example embodiment. The method 400 may be performed by processing logic that may comprise hardware (e.g., dedicated logic, programmable logic, microcode, etc.), software (such as run on a general purpose computer system or a dedicated machine), or a combination of both. In one example embodiment, the processing logic resides at the server system 110 of FIG. 1 and, specifically, at the system 200 shown in FIG. 2.

As shown in FIG. 4, the method 400 commences at operation 410, when the chrome remover 112 accesses a web page. At operation 420, the parsing module 202 of FIG. 2 parses the web page into a tree structure based on the HTML hierarchy associated with the web page. For each node in the tree structure, the text density analyzer 204 of FIG. 2 determines a text density score value (operation 430). At operation 440, those nodes having text density score value above a predetermined threshold value are identified as content nodes. The text extractor 208 of FIG. 2 extracts, at operation 450, text from content nodes but not from nodes that were not identified as content nodes.

Figure 5:
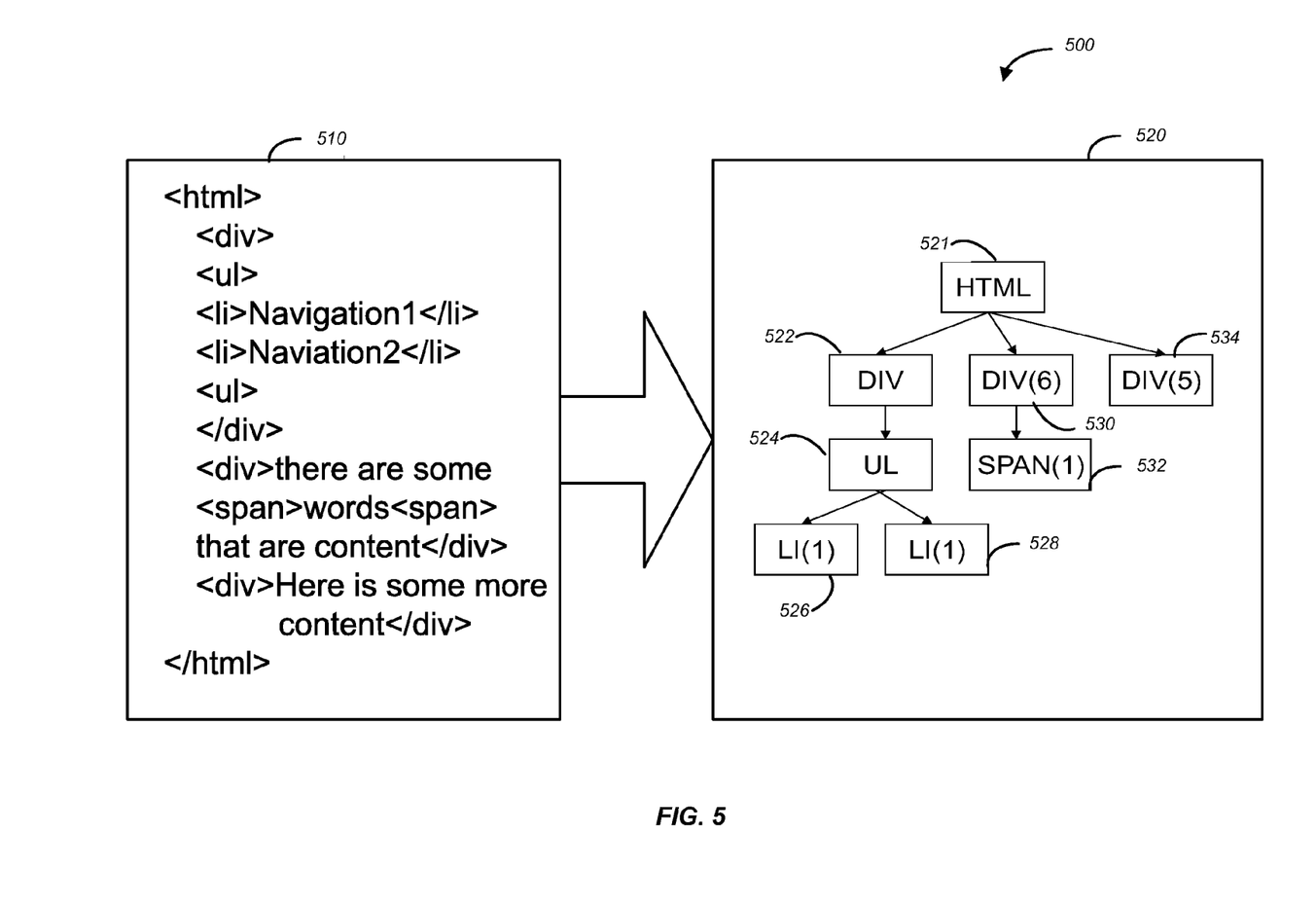
FIG. 5 is a diagrammatic representation of an example web page and a corresponding tree structure.

For example, the parsing module 202 may access a web page represented by HTML code such as shown in FIG. 5 in block 510. Each pair of tags in the HTML code shown in block 510 corresponds to a node in a tree structure 520. The node associated with the first "DIV" tag in the web page (that corresponds to node 522 in the tree structure 520) does not contain any text. Its immediate child (node 524 that corresponds to the nested tag "UL" in the HTML code shown in block 510) also does not contain text, and its remote children (nodes 526 and 528) each contain one word ("Navigation"). The node 530 associated with the second "DIV" tag contains 6 words, its child (node 532) contains 1 word, and the third "DIV" tag contains 5 words. It will be noted that tags themselves are not counted as words.

A text density score value for a subject node is determined as the sum of the number of words directly associated with the subject node plus the number of words contained in adjacent nodes—nodes that are children, siblings or a parent of the subject node. The number of words contained in the nodes that are children, siblings or a parent of the subject node may be weighted prior to being added to the number of words directly associated with the subject node. Different weights may be associated with the parent nodes, sibling nodes, and child nodes. The number of words contained in an adjacent node that is located closer to the subject node in the hierarchy may contribute more heavily to the text density score value for the subject node than the number of words contained in an adjacent node that is located further away in the hierarchy from the subject node.

Thus, the text density score for the node 522 is the number of words contained in the node 522 (zero) plus the number of words contained in its parent node 521 (zero), plus the number of words contained in the node 524 weighted by a predetermined coefficient (zero), plus the number of words contained in the nodes 526 and 528 weighted by a predetermined coefficient (if the coefficient is 0.5, the value contributed by each one of the nodes 526 and 528 is 0.5, adding to 1), plus the number of words contained in the nodes 530 and 534 weighted by a predetermined coefficient.

Returning to FIG. 4, when the text density analyzer 204 of FIG. 2 determines respective text density values for each node in the HTML tree structure, each value is compared to a threshold value. Only those nodes for which a text density value is above the threshold value are identified. as content nodes operation 440). At operation 450, the text extractor 208 of FIG. 2 extracts text from content nodes and ignores any text associated with nodes that were not identified as content nodes. As explained above, the extracted text may be processed further to remove any boilerplate language and provided to a consuming application, where the text may be analyzed still further to generate information regarding the subject matter associated with the source web pages.

Figure 6:
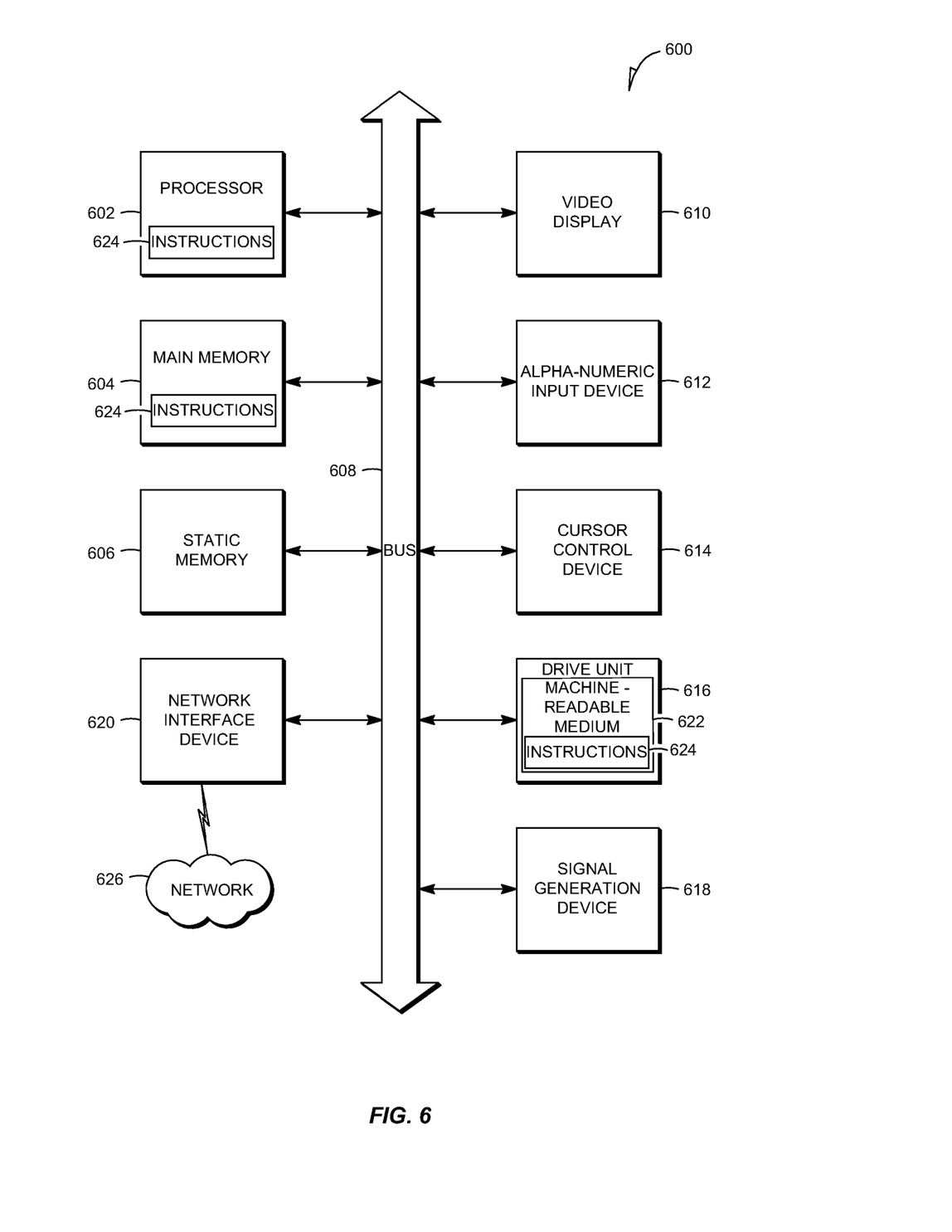
FIG. 6 is a diagrammatic representation of an example machine in the form of a computer system within which a set of instructions, for causing the machine to perform any one or more of the methodologies discussed herein, may be executed.

FIG. 6 shows a diagrammatic representation of a machine in the example form of a computer system 600 within which a set of instructions, for causing the machine to perform any one or more of the methodologies discussed herein, may be executed. In alternative embodiments, the machine operates as a stand-alone device or may be connected (e.g., networked) to other machines. In a networked deployment, the machine may operate in the capacity of a server or a client machine in a server-client network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 600 includes a processor 602 (e.g., a central processing unit (CPU), a graphics processing unit (GPU) or both), a main memory 604 and a static memory 606, which communicate with each other via a bus 608. The computer system 600 may further include a video display unit 610 (e.g., a liquid crystal display (LCD) or a cathode ray tube (CRT)). The computer system 600 also includes an alpha-numeric input device 612 (e.g., a keyboard), a user interface (UI) navigation device 614 (e.g., a cursor control device), a disk drive unit 616, a signal generation device 618 (e.g., a speaker) and a network interface device 620.

The disk drive unit 616 includes a machine-readable medium 622 on which is stored one or more sets of instructions and data structures (e.g., software 624) embodying or utilized by any one or more of the methodologies or functions described herein. The software 624 may also reside, completely or at least partially, within the main memory 604 and/or within the processor 602 during execution thereof by the computer system 600, with the main memory 604 and the processor 602 also constituting machine-readable media.

The software 624 may further be transmitted or received over a network 626 via the network interface device 620 utilizing any one of a number of well-known transfer protocols (e.g., Hyper Text Transfer Protocol (HTTP)).

While the machine-readable medium 622 is shown in an example embodiment to be a single medium, the term "machine-readable medium" should be taken to include a single medium or multiple media (e.g., a centralized or distributed database, and/or associated caches and servers) that store the one or more sets of instructions. The term "machine-readable medium" shall also be taken to include any medium that is capable of storing and encoding a set of instructions for execution by the machine and that cause the machine to perform any one or more of the methodologies of embodiments of the present invention, or that is capable of storing and encoding data structures utilized by or associated with such a set of instructions. The term "machine-readable medium" shall accordingly be taken to include, but not be limited to, solid-state memories, optical and magnetic media. Such media may also include, without limitation, hard disks, floppy disks, flash memory cards, digital video disks, random access memory (RAMs), read only memory (ROMs), and the like.

The embodiments described herein may be implemented in an operating environment comprising software installed on a computer, in hardware, or in a combination of software and hardware. Such embodiments of the inventive subject matter may be referred to herein, individually or collectively, by the term "invention" merely for convenience and without intending to voluntarily limit the scope of this application to any single invention or inventive concept if more than one is, in fact, disclosed.

Thus, a method and system for removing chrome from web pages has been described. Although embodiments have been described with reference to specific example embodiments, it will be evident that various modifications and changes may be made to these embodiments without departing from the broader spirit and scope of the inventive subject matter. Accordingly, the specification and drawings are to be regarded in an illustrative rather than a restrictive sense.

What is claimed is:

1. A method comprising:
    accessing a web page, the web page represented by a hierarchical mark-up language;
    parsing the web page into a tree structure based on a hierarchy associated with the web page;
    for each node from the tree structure, determining a text density score value, the text density score value calculated as a sum of a word count associated with a node and weighted word counts associated with adjacent nodes from the tree structure, an adjacent node from the adjacent nodes comprising a sibling of the node;
    identifying those nodes from the tree structure for which a text density value is above the threshold value as content nodes;
    extracting text from the content nodes associated with the web page and ignoring nodes that were not identified as content nodes;
    breaking up the extracted text and further text into a plurality of sentences;
    hashing each sentence from the plurality of sentences;
    calculating frequency of each sentence in the extracted text and the further text; and
    identifying sentences from one or more sentences having a frequency value above a frequency threshold value as indicative of boilerplate language.

2. The method of claim 1, comprising:
    providing the extracted text associated with the web page to a sentence analyzer; and
    removing from the extracted text the one or more sentences indicative of boilerplate language to produce subject text.

3. The method of claim 2, further comprising providing the subject text to a consuming application.

4. The method of claim 1, wherein the further text is associated with one or more further web pages, the web page is associated with a first web page and a further web page from the one or more further web pages is associated with a second web page.

5. The method of claim 1, comprising removing structured chrome from the web page prior to the parsing of the web page into the tree structure.

6. The method of claim 5, wherein structured chrome comprises embedded Cascading Style Sheets (CSS).

7. The method of claim 1, wherein the web page is represented by HyperText Markup Language (HTML).

8. The method of claim 7, wherein a node from the nodes that were not identified as content nodes is associated with navigation, advertising, or HTML comments.

9. A computer system comprising:
    a parsing module, implemented using one or more processors, to parse, using the at least one processor, a web page into a tree structure based on hierarchy of a hierarchical mark-up language associated with the web page;
    a text density analyzer, implemented using one or more processors, to determine, using the at least one processor, a text density score value for each node from the tree structure, the text density score value calculated as a sum of a word count associated with a node and weighted word counts associated with adjacent nodes from the tree structure, an adjacent node from the adjacent nodes comprising a sibling of the node, a sibling of the node or a child of the node;
    a content node selector, implemented using one or more processors, to identify, using the at least one processor, those nodes from the tree structure for which a text density value is above the threshold value as content nodes;
    a text extractor, implemented using one or more processors, to extract, using the at least one processor, text from the content nodes associated with the web page and ignoring nodes that were not identified as content nodes; and
    a sentence analyzer, implemented using one or more processors, to, using the at least one processor:
        break up the extracted text and further text into a plurality of sentences,
        hash each sentence from the plurality of sentences,
        calculate frequency of each sentence from the plurality of sentences in the extracted text and the further text, and
        identify a sentence from the plurality of sentences having a frequency value above a frequency threshold value as indicative of boilerplate language.

10. The system of claim 9, comprising:
    a boilerplate filter to remove from the extracted text sentences indicative of boilerplate language to produce subject text.

11. The system of claim 10, further comprising a communications module to provide the subject text to a consuming application.

12. The system of claim 9, wherein the further text is associated with one or more further web pages, the web page is associated with a first web page and a further web page from the one or more further web pages is associated with a second web page.

13. The system of claim 9, comprising a structured chrome filter to remove structured chrome from the web page.

14. The system of claim 13, wherein structured chrome comprises embedded CSS.

15. The system of claim 9, wherein the web page is represented by HyperText Markup Language (HTML).

16. A machine-readable non-transitory storage medium having instruction data to cause a machine to perform operations comprising:
    parsing a web page into a tree structure based on a hierarchy of a mark-up language associated with the web page;
    determining a text density score value for each node from the tree structure, the text density score value calculated as a sum of a word count associated with a node and weighted word counts associated with adjacent nodes from the tree structure, an adjacent node from the adjacent nodes comprising a sibling of the node;
    identifying those nodes from the tree structure for which a text density value is above the threshold value as content nodes; and extracting text from the content nodes associated with the web page and ignoring nodes that were not identified as content nodes, the extracted text associated with the web page;

breaking up the extracted text and further text into a plurality of sentences;

hashing each sentence from the plurality of sentences;

calculating frequency of each sentence from the plurality of sentences in the extracted text and the further text; and identifying a sentence from the plurality of sentences having a frequency value above a frequency threshold value as indicative of boilerplate language.

* * * * *